United States Patent [19]

Nagai

[11] Patent Number: 5,369,788

[45] Date of Patent: Nov. 29, 1994

[54] MINIATURE PORTABLE RADIO COMMUNICATION APPARATUS

[75] Inventor: Michio Nagai, Tokyo, Japan

[73] Assignee: NEC Corporation, Japan

[21] Appl. No.: 207,795

[22] Filed: Mar. 7, 1994

Related U.S. Application Data

[63] Continuation of Ser. No. 952,557, Sep. 28, 1992, abandoned.

[30] Foreign Application Priority Data

Sep. 30, 1991 [JP] Japan .................. 3-276442

[51] Int. Cl.⁵ .................................. H04B 1/38
[52] U.S. Cl. ........................ 455/90; 455/348; 455/351; 379/433; 379/440
[58] Field of Search ............ 455/89, 90, 349, 350, 455/347, 348, 351, 95; 379/431, 428, 433, 434, 61, 440; D14/138, 147, 148, 151

[56] References Cited

U.S. PATENT DOCUMENTS

| D. 326,092 | 5/1992 | Kikuchi et al. | D14/138 |
| D. 326,451 | 5/1992 | Roegner | 379/433 |
| 4,847,818 | 7/1989 | Olsen | 455/350 |
| 4,856,088 | 8/1989 | Oliva et al. | 455/351 |
| 5,109,539 | 4/1992 | Inubushi et al. | 455/89 |
| 5,151,946 | 9/1992 | Martensson | 379/433 |

FOREIGN PATENT DOCUMENTS

| 0414365 | 2/1991 | European Pat. Off. . | |
| 2593656 | of 1987 | France . | |
| 3836406 | 5/1990 | Germany . | |
| 0038149 | 2/1991 | Japan | 379/433 |
| 0198436 | 8/1991 | Japan | 455/89 |
| 2201861 | 9/1988 | United Kingdom | 379/433 |
| 2235850 | 3/1991 | United Kingdom | 379/433 |
| 8707798 | 12/1987 | WIPO | 379/433 |
| 8909524 | 10/1989 | WIPO | 379/433 |

*Primary Examiner*—Reinhard J. Eisenzopf
*Assistant Examiner*—Nguyen Vo
*Attorney, Agent, or Firm*—Laff, Whitesel, Conte & Saret

[57] ABSTRACT

A miniature portable radio communication apparatus. A single casing includes a transmitter and a display. A movable member slidably received in the casing may be pulled out, as needed, and loaded with a receiver.

1 Claim, 4 Drawing Sheets

MINIATURE PORTABLE RADIO COMMUNICATION APPARATUS

This application is a continuation of application Ser. No. 07/952,557, filed Sep. 28, 1992, now abandoned.

BACKGROUND OF THE INVENTION

The present invention relates to a miniature portable radio communication apparatus enhancing portability due to a miniature configuration, promoting easy manipulation, and allowing the user to see a display and/or operate keys at all times.

A hand-held radio telephone or similar portable radio communication apparatus is generally made up of a radio unit, a transmitter, a receiver, an operating section including various keys or buttons, and a display for displaying various kinds of information including time. The prerequisite with this kind of apparatus is that the transmitter and the receiver match in position with the user's mouth and ear, respectively, resulting in a bulky and uneasy-to-carry configuration. In the light of this, there has been proposed a foldable radio communication apparatus having a first casing loaded with a transmitter, display and so forth, and a second casing loaded with a receiver, operating section and so forth. The first and second casings are hinged to be movable toward and away from each other. With such a configuration, the apparatus is folded up when out of operation or unfolded, or opened, when in use.

The conventional foldable radio apparatus is easy to carry since it is substantially halved in size when out of use. However, this type of conventional radio apparatus has a problem that the keys cannot be operated when the apparatus is in the folded position, i.e., the user has to unfold the two casings every time the user desires to operate the keys. Another problem is that when folded the apparatus conceals the display thereof and, therefore, prevents the user to see time or similar information. In addition, although the overall size is substantially halved, the overall thickness is doubled.

SUMMARY OF THE INVENTION

It is therefore an object of the present invention to provide a portable radio communication apparatus which is miniature enough to enhance portability.

It is another object of the present invention to provide a miniature portable radio communication apparatus which is easy to operate.

It is another object of the present invention to provide a miniature portable radio communication apparatus allowing the user to see a display and/or operate keys thereof at all times.

A miniature portable radio communication apparatus of the present invention comprises a single casing loaded with at least one of a transmitter and a receiver, a key operating section, and a display, and a movable member loaded with the other of the transmitter and the receiver and slidably received in the single casing.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
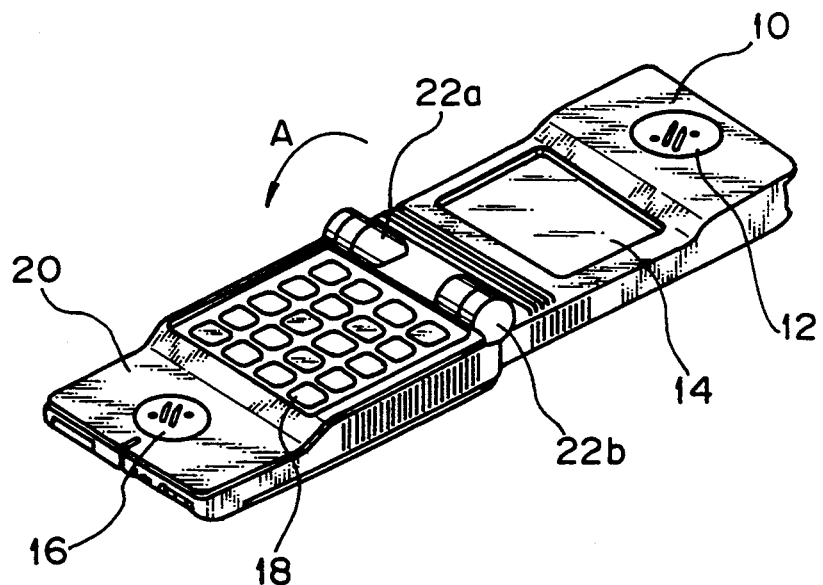
FIG. 1 is a perspective view of a conventional foldable miniature radio communication apparatus.

To better understand the present invention, a brief reference will be made to a conventional foldable portable radio communication apparatus elaborated to reduce the overall size, as stated earlier. As shown in FIG. 1, the foldable apparatus has a first casing 10 loaded with a transmitter 12 and a display 14, and a second casing 20 loaded with a receiver 16 and keys 18. The casings 10 and 20 are foldably connected to each other by hinge mechanisms 22a and 22b. The casings 10 and 20 are folded when the apparatus is not used or unfolded in a direction indicated by an arrow A in the figure when the apparatus is used. Such a configuration has various problems left unsolved, as discussed earlier.

Figure 2:
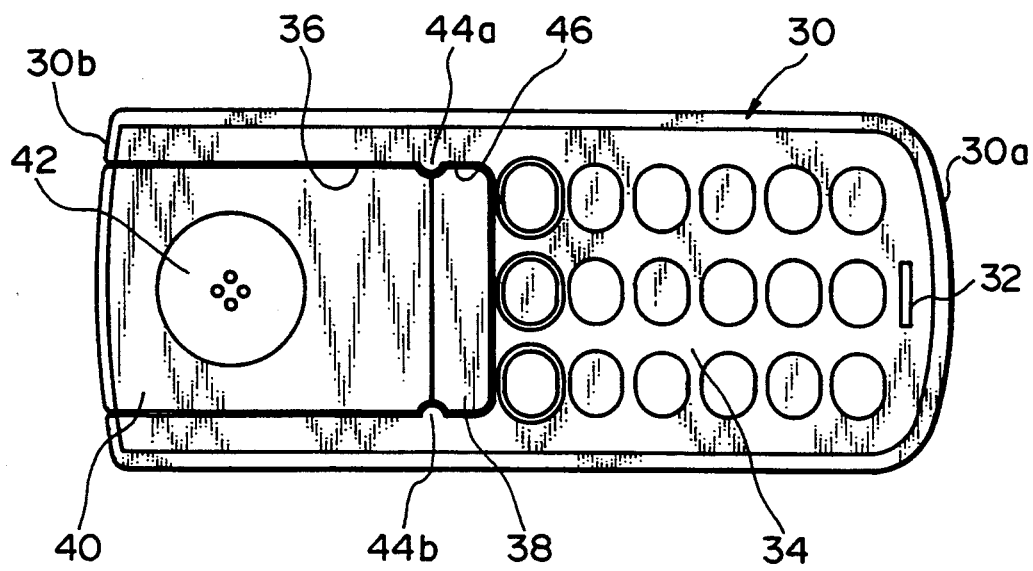
FIG. 2 is a plan view showing a miniature radio communication apparatus embodying the present invention with a movable drawer-like portion in a fully stowed condition wherein it is not used.

Referring to FIG. 2, a miniature portable radio communication apparatus embodying the present invention is shown which is free from the problems particular to the conventional apparatus having a foldable configuration. FIGS. 3, 4, 5 and 6 each shows the embodiment in a particular view.

As shown in FIGS. 2–6, the apparatus has a casing 30. A transmitter 32 is mounted on the casing 30 near one end 30a of the latter. A key operating section, generally 34, is arranged over the area of the casing 30 extending from the transmitter 32 to substantially the center. The key operating section 34 includes dial keys and various function keys, e.g., a speed call key and a hold key. A recess is formed in the casing 30 to extend from the operating section 34 to the other end 30b of the casing 30 and is open at the end 30b. A display 38 is located on part of the bottom of the recess 36 which is close to the center of the casing 30. Opposite side walls of the recess 36 are formed with means, for example, grooves, for receiving a sliding drawer-like structure; 40 which is received in the recess 36 to be slidable back and forth along the grooves. The movable member, or slider 40, is provided with a thin box-like configuration and carries a receiver 42 on the front thereof.

Stops in the form of lugs 44a and 44b protrude from the grooved walls of the recess 36 toward each other at a position adjacent to the center of the casing 30. The distance between the stops 44a and 44b and the end 30b of the casing 30 is selected to be substantially equal to the longitudinal dimension of the slider 40. In this configuration, when the slider 40 is pushed into the casing 30 until the stops 44a and 44b lock it, a clearance 46 is formed between the slider 40 and the casing 30. The display 38 is partly visible through the clearance 46.

Of course, the slider 40 and casing 30 are electrically connected to each other by, for example, a flexible cable, although not shown in the figures.

Figure 3:
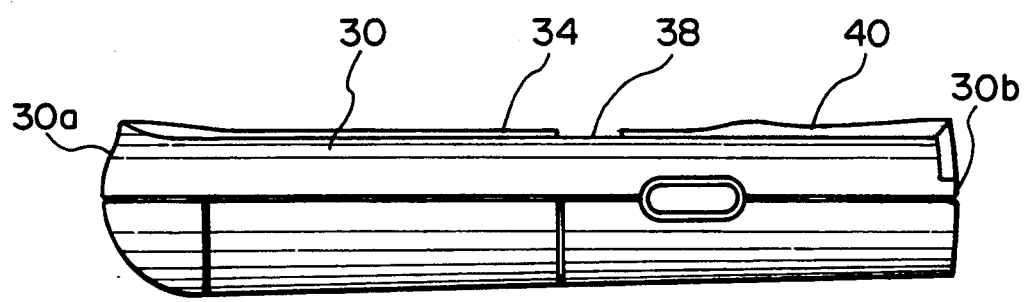
FIG. 3 is a rear view of the embodiment.
Figure 4:
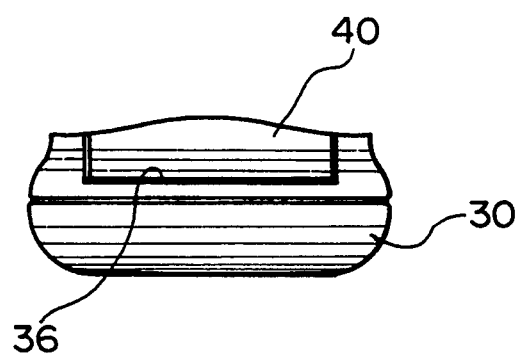
FIG. 4 is a side elevation of the embodiment.
Figure 5:
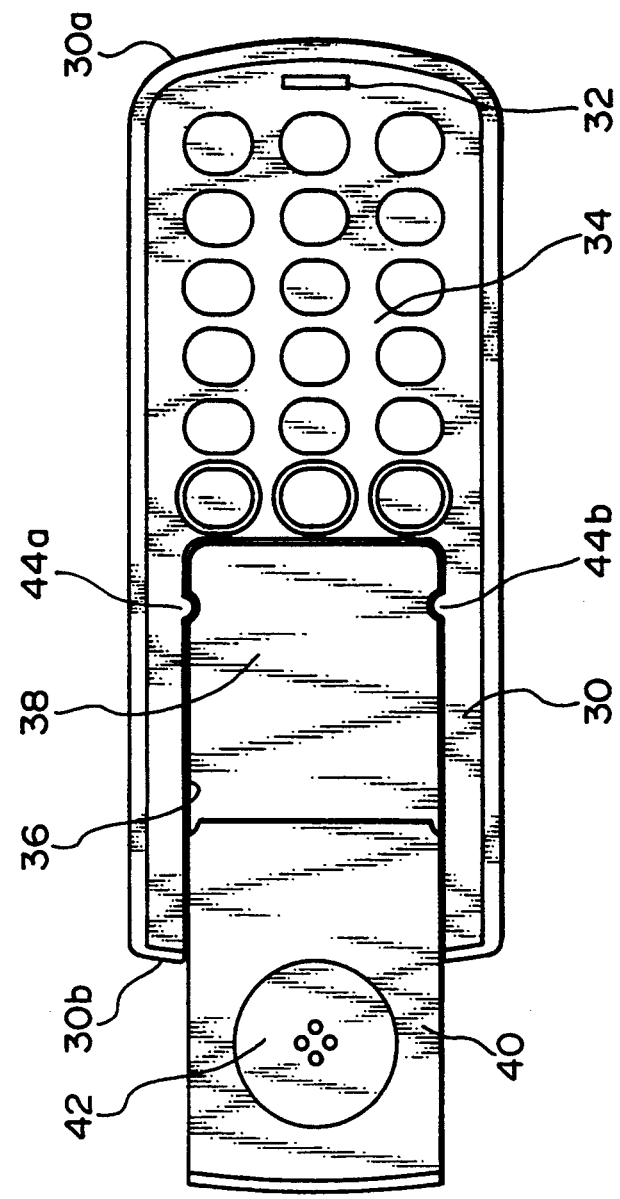
FIG. 5 is a plan view showing the embodiment with the drawer-like portion in a service condition wherein it is used.
Figure 6:
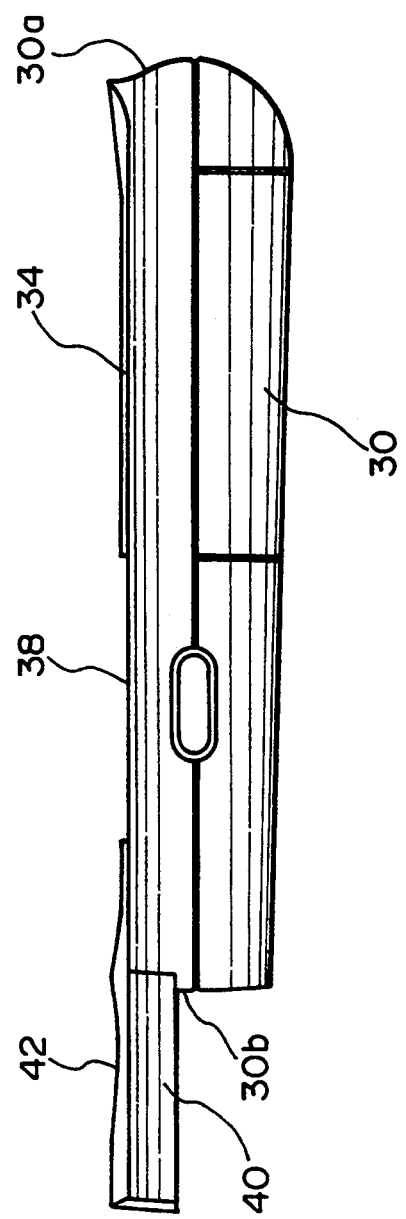
FIG. 6 is a front view of the embodiment held in the service condition of FIG. 5.

As shown in FIGS. 2–4, when the apparatus is not used, the slider 40 is received in the recess 36 of the casing 30 to reduce the overall length of the apparatus. In this condition, part of the display 38 appears through the clearance 46 between the slider 40 and the casing 30, showing time or similar information. On the other hand, as shown in FIGS. 5 and 6, the slider 40 is pulled out of the casing when in use. Then, the distance between the transmitter 32 and the receiver 42 is increased to match them in position to the user's ear and mouth. Of course, the slider 40 can be pulled out to any desired position matching the user.

Preferably, the casing 30 is provided with a click mechanism or similar implementation for holding the slider 40 in the position pulled out of the casing 30 to thereby prevent it from slipping out. When the slider 40 is pulled out of the casing 30, substantially the entire display 38 is exposed to show many kinds of information, e.g., the dialling number and the duration of a conversation.

In summary, it will be seen that the present invention provides a miniature portable radio communication apparatus which allows the user to freely set up a distance between a transmitter and a receiver thereof which is optimal for clear conversations. This is because a movable member carrying the receiver is slidably received in a casing loaded with the transmitter and a display. Moreover, such a configuration is extremely small size and, therefore, easy to carry. In addition, even when the movable member is fully received in the casing, the user can operate keys arranged on the casing and can see a minimum amount of information since the display is partly exposed to the outside.

Various modifications will become possible for those skilled in the art after receiving the teachings of the present disclosure without departing from the scope thereof.

What is claimed is:

1. A miniature portable radio communication apparatus comprising;

a casing formed with a recess extending in a longitudinal direction;

a movable portion slidable received in said recess and loaded with at least a receiver, said slidable portion being movable between a fully stowed and a service position; and a display means mounted on a bottom of said recess of said casing, said display means being at least partly exposed to the outside of said casing when said movable portion is received in said fully stowed position within said casing, and said display means being fully exposed to the outside of said casing when said movable portion is in said service position.

* * * * *